(12) United States Patent
Henry (10) Patent No.: US 11,418,557 B1
(45) Date of Patent: Aug. 16, 2022

(54) SYSTEMS AND METHODS FOR AUTOMATICALLY SWITCHING BETWEEN MEDIA STREAMS

(71) Applicant: Meta Platforms, Inc., Menlo Park, CA (US)

(72) Inventor: Colleen Kelly Henry, Oakland, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/349,498

(22) Filed: Jun. 16, 2021

(51) Int. Cl.
*H04L 65/61* (2022.01)
*H04L 65/80* (2022.01)

(52) U.S. Cl.
CPC .......... *H04L 65/4069* (2013.01); *H04L 65/80* (2013.01)

(58) Field of Classification Search
CPC ............................. H04L 65/4069; H04L 65/80
See application file for complete search history.

(56) References Cited

U.S. PATENT DOCUMENTS

| | | | |
|---|---|---|---|
| 2002/0126226 A1* | 9/2002 | Dudkowski | H04N 5/222 348/722 |
| 2002/0133247 A1* | 9/2002 | Smith | H04N 7/163 700/94 |
| 2007/0204294 A1* | 8/2007 | Walker | H04N 21/234327 725/38 |
| 2011/0161485 A1* | 6/2011 | George | H04N 21/44209 709/224 |
| 2013/0132604 A1* | 5/2013 | Cohen | H04W 76/15 709/231 |
| 2014/0269401 A1* | 9/2014 | Gondi | H04L 43/0876 370/253 |
| 2014/0320662 A1* | 10/2014 | McNamee | H04N 5/23293 348/159 |
| 2016/0381109 A1* | 12/2016 | Barnett | G06Q 10/10 709/231 |
| 2016/0381111 A1* | 12/2016 | Barnett | H04N 5/23293 709/231 |
| 2018/0098073 A1* | 4/2018 | Lawrence | H04N 19/597 |
| 2019/0110096 A1* | 4/2019 | Shaw | H04N 21/4223 |
| 2020/0267427 A1* | 8/2020 | Rogers | H04N 21/2668 |

* cited by examiner

*Primary Examiner* — Javier O Guzman
(74) *Attorney, Agent, or Firm* — FisherBroyles, LLP (57) ABSTRACT

A computer-implemented method for automatically switching between media streams may include (i) identifying a plurality of media streams of an event, where one media stream from the plurality is designated as a primary stream of the event that is transmitted by default to at least one viewer of the event, (ii) selecting a media stream from the plurality of media streams to be the primary stream based on a favorable characteristic of the media stream, (iii) detecting that a different media stream within the plurality of media streams has a more favorable characteristic compared to the media stream, (v) in response to detecting that the different media stream has the more favorable characteristic, automatically selecting the different media stream to be the primary stream and (v) transmitting the different media stream to the at least one viewer of the event. Various other methods, systems, and computer-readable media are also disclosed.

20 Claims, 7 Drawing Sheets

SYSTEMS AND METHODS FOR AUTOMATICALLY SWITCHING BETWEEN MEDIA STREAMS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods that function as a technical director for an event with multiple video and/or audio streams by selecting which camera stream and/or other content stream to include in a main stream (also known as a program feed) based on user interactions and/or other data. For example, the systems described herein may provide streams of multiple camera angles of an event and may select which camera angle to use for the main stream based on which camera angle is being independently followed by the most users in the audience at a given time (e.g., via a web portal which enables users to choose between available cameras). Additionally or alternatively, the systems described herein may use other data about the event to determine which camera stream to select. For example, if the event is a football game, the system may use various techniques such as machine vision, depth sensing, and/or hyperspectral sensing, to track the football across cameras and may select a camera that currently has the football within the frame. In some embodiments, the systems described herein may combine other content with the video, such as selecting an audio commentary stream based on popularity and/or other information. In another example, the systems described herein may automatically overlay graphics on the video stream (e.g., a presenter's name and title, a player's statistics, etc.) by detecting relevant content in the video stream. In one embodiment, the systems described herein may enable custom stream and/or content selection on a per-user basis. For example, the systems described herein may enable a user to select a particular athlete in a sporting event and create a custom stream for that user that follows the athlete across multiple cameras as the event progresses to keep the athlete optimally on screen. By creating a primary stream of an event or a user-specific custom stream of the event from multiple streams based on various heuristics, the systems described herein may efficiently improve the viewing experience for viewers of an event.

In some embodiments, the systems described herein may improve the functioning of a computing device by enabling the computing device to automatically switch between streams of an event without human interaction. This may enable the computing device to respond more quickly to changes in the event (e.g., a football leaving one camera frame and entering another) than would otherwise be possible. Additionally, the systems described herein may improve the fields of event broadcasting and/or event streaming by efficiently creating primary streams and/or user-specific custom streams from multiple available streams of an event.

Figure 1:
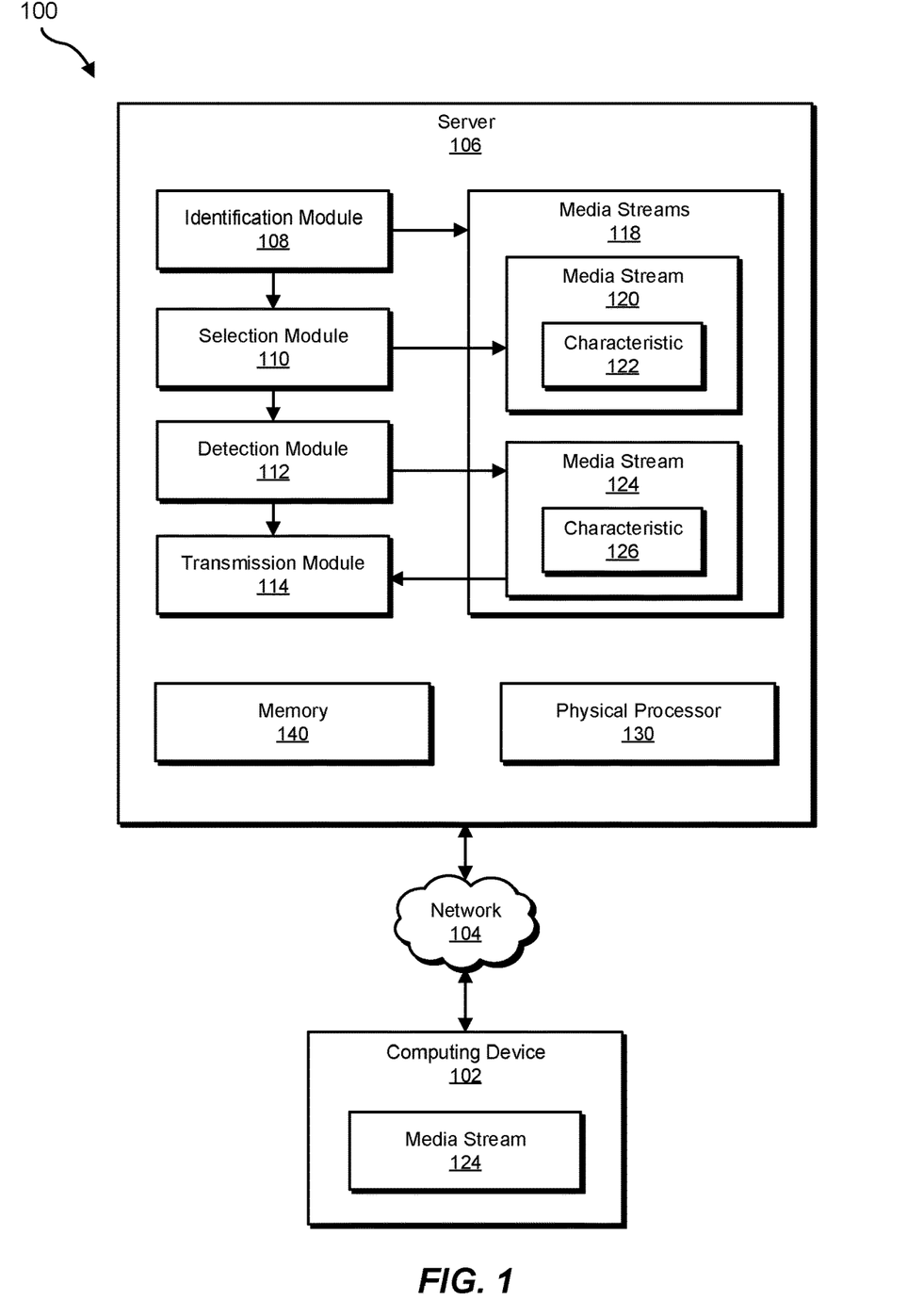
FIG. 1 is a block diagram of an exemplary system for automatically switching between media streams.

In some embodiments, the systems described herein may operate on a server that streams media to one or more computing devices. FIG. 1 is a block diagram of an exemplary system 100 for automatically switching between media streams. In one embodiment, and as will be described in greater detail below, a server 106 may be configured with an identification module 108 that may identify media streams 118 of an event, where one media stream from the plurality is designated as a primary stream of the event that is transmitted by default to at least one viewer of the event (e.g., to a computing device 102 via a network 104). Selection module 110 may select a media stream 120 from media streams 118 to be the primary stream based on a characteristic 122 of media stream 120. At some later point, detection module 112 may detect that a media stream 124 within media streams 118 has a characteristic 126. In response to detecting that stream 124 has characteristic 126, selection module 110 may automatically select media stream 124 to be the primary stream. Transmission module 114 may transmit media stream 124 to at least one viewer of the event.

Server 106 generally represents any type or form of backend computing device that may receive, transmit, and/or manage media streams. Examples of server 106 may include, without limitation, media servers, application servers, database servers, and/or any other relevant type of server. Although illustrated as a single entity in FIG. 1, server 106 may include and/or represent a group of multiple servers that operate in conjunction with one another.

Computing device 102 generally represents any type or form of computing device capable of reading computer-executable instructions. For example, computing device 102 may represent a personal computing device and/or an end-point computing device. Examples of computing device 102 may include, without limitation, a laptop, a desktop, a wearable device, a smart device, an artificial reality device, a personal digital assistant (PDA), etc.

Media streams 118 generally represent any type or form of digital media file capable of being streamed (e.g., transmitted in parts rather than in its entirety). In some embodiments, media streams 118 may include video streams of an event. Additionally or alternatively, media streams 118 may include audio streams. In one embodiment, media streams 118 may include metadata streams with information including but not limited to depth, camera position, and/or camera orientation. In some embodiments, media streams 118 may include a mix of video and audio streams of the same event. In one example, media streams 118 may include streams that are transmitted in real time of an ongoing live event. Additionally or alternatively, media streams 118 may include recordings of an event. In some embodiments, media streams 118 may include a combination of streams captured by recording devices (e.g., cameras and/or microphones) and streams generated by other sources. For example, media streams 118 may include a number of live streams of a football game from different cameras as well as a stream of a highlights reel for each player created by commentators and/or a stream that is only sometimes active and includes an instant replay of the last play.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
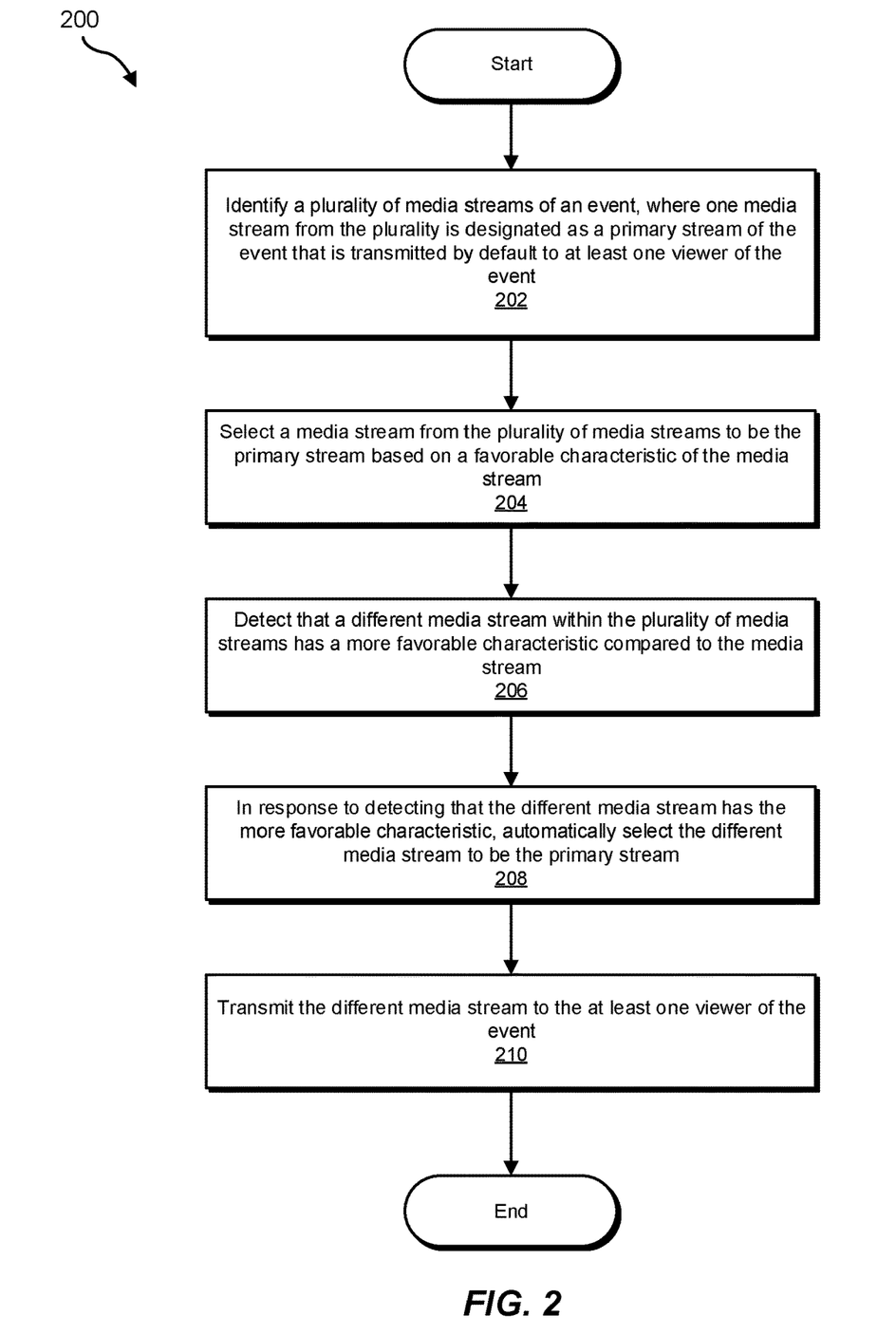
FIG. 2 is a flow diagram of an exemplary method for automatically switching between media streams.

FIG. 2 is a flow diagram of an exemplary method 200 for automatically switching between media streams. In some examples, at step 202, the systems described herein may identify a plurality of media streams of an event, where one media stream from the plurality is designated as a primary stream of the event that is transmitted by default to at least one viewer of the event. For example, identification module 108 may, as part of server 106 in FIG. 1, identify media streams 118 of an event, where one media stream from the plurality is designated as a primary stream of the event that is transmitted by default to at least one viewer of the event.

Identification module 108 may identify a variety of different types of media streams. For example, identification module 108 may identify real-time media streams of a live event, such as a sporting event, a theatrical event, and/or any other type of live event. In one example, identification module 108 may identify a variety of different camera angles showing a sporting event and/or commentators on the sporting event. In another example, identification module 108 may identify a variety of different video and/or audio streams of a musical theater performance.

In some examples, identification module 108 may identify a primary stream of the event that is the default stream transmitted to viewers of the event via a particular platform (e.g., a social media platform, a television channel, etc.). In some embodiments, there may be options for viewers to view a non-primary stream of the event. For example, a social media platform may have a landing page for an event that displays the primary stream of the event as well as options for viewers to select another stream to view. In one example, a primary stream may currently be showing a wide angle view of a football field but a particular viewer might instead select to view the stream of a camera pointed at one team's bench.

At step 204, one or more of the systems described herein may select a media stream from the plurality of media streams to be the primary stream based on a favorable characteristic of the media stream. For example, selection module 110 may, as part of server 106 in FIG. 1, select media stream 120 from media streams 118 to be the primary stream based on a characteristic 122 of media stream 120.

The term "favorable characteristic" generally refers to any characteristic, aspect, and/or trait of a media stream and/or the content of the media stream. In some examples, a favorable characteristic may refer to how viewers interact with a media stream, such as a number of viewers of a stream and/or the type of viewers of a stream (e.g., viewers with a history of selecting high-quality streams). In other examples, a characteristic may refer to the content of a media stream, such as items or people visible or audible within the content of a media stream. For example, whether or not a particular person is within the frame of a camera that is capturing a media stream may be a characteristic of the media stream. Other examples of favorable characteristics may include, without limitation, camera focus, quality and/or usability of lighting, and/or positioning of subjects within the frame (e.g., is the subject well-framed in the center of the shot or is the subject only partially within the frame, etc.).

The systems described herein may determine whether a characteristic is favorable in a number of ways. For example, the systems described herein may be configured to automatically classify the presence or absence of a certain characteristic as favorable (e.g., the characteristic of having a football in the camera frame may be favorable). In other examples, the systems described herein may enable a viewer to configure options about what characteristics are favorable. In some examples, the systems described herein may use numerical comparisons to determine whether a characteristic is more favorable than another, such as determining that a higher number of viewers is more favorable than a lower number. Similarly, the systems described herein may determine that a camera that is showing more of a person and/or a more zoomed-in view of a person (e.g., devoting a mathematically greater area within the frame to pixels representing the person) is more favorable.

Selection module 110 may select the stream to be the primary stream based on a variety of different favorable characteristics. In some embodiments, selection module 110 may select the media stream that is currently being independently watched by the most viewers (e.g., the stream with the most favorable viewership characteristic). In some embodiments, the systems described herein may enable viewers to independently select a stream to view that is not the primary stream. In these embodiments, the systems described herein may track independent viewership numbers for each stream to gauge the relative popularity of different media streams.

Figure 3:
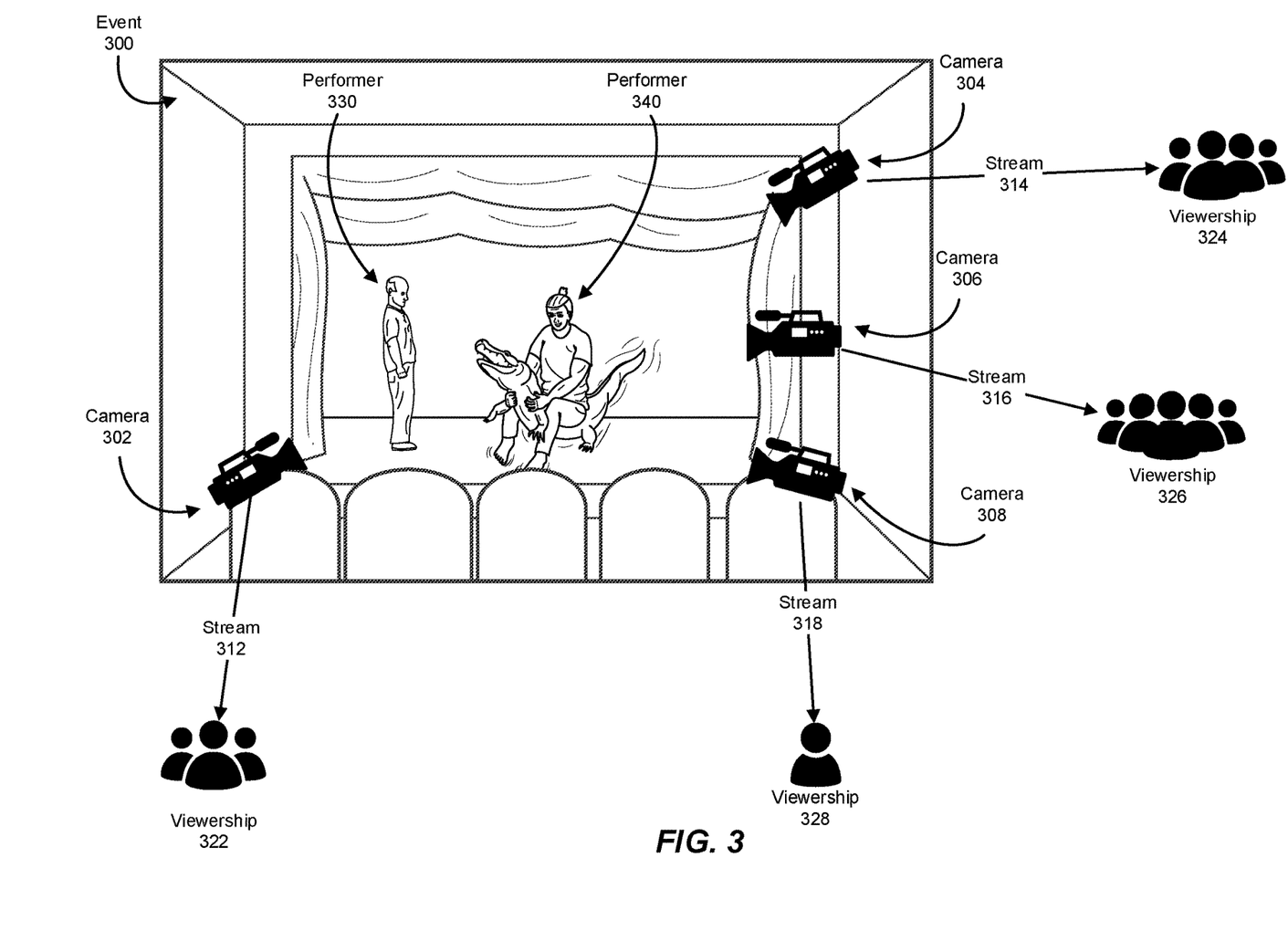
FIG. 3 is an illustration of an exemplary set of media streams with different viewership.

For example, as illustrated in FIG. 3, an event 300 may be a theatrical performance about alligator wrestling that is being captured from multiple different angles by cameras 302, 304, 306, and/or 308. In one example, camera 302 may capture a stream 312 with a current viewership 322, camera 304 may capture a stream 314 with a current viewership 324, camera 306 may capture a stream 316 with a current viewership 326, and/or camera 308 may capture a stream 318 with a current viewership 328. In this example, viewership 326 may be the highest viewership, meaning that stream 316 has the favorable characteristic of having the highest current viewership. In this example, selection module 110 may select stream 316 as the primary stream for the theatrical performance. In some embodiments, selection module 110 may select a stream based on popularity with a specific subset of viewers. For example, the systems described herein may track the overall popularity and/or quality of streams selected by each user and may designate users with a history of selecting popular and/or high-quality streams as superusers. In some examples, selection module 110 may select the stream that is most popular with superusers even if another stream has higher overall viewership numbers.

Additionally or alternatively, the systems described herein may select streams based on other characteristics. For example, a performer 330 and a performer 340 may alternate speaking. In one example, the systems described herein may select, as the primary stream, a video stream that shows the face of the performer who is currently speaking. In another example, the systems described herein may use another characteristic (e.g., popularity) to select the video stream, but may switch between audio streams based on who is speaking. For example, the systems described herein may select a microphone attached to performer 330 as the primary audio stream when performer 330 is speaking and may similarly select a microphone attached to performer 340 as the primary audio stream when performer 340 is speaking, rather than relying on a single audio stream from a microphone that picks up both performers' speech as well as background noises that may be undesirable.

Returning to FIG. 2, at step 206, one or more of the systems described herein may detect that a different media stream within the plurality of media streams has a more favorable characteristic compared to the media stream. For example, detection module 112 may, as part of server 106 in FIG. 1, detect that a media stream 124 within media streams 118 has characteristic 126.

Detection module 112 may detect that the media stream has the favorable characteristic in a variety of ways. For example, detection module 112 may compare values associated with the media stream, such as comparing the number of independent viewers of a stream. In another example, detection module 112 may use any suitable image-recognition algorithm (e.g., a machine learning algorithm) to detect the presence of an object or a person in a video stream. In one example, detection module 112 may use a voice-recognition algorithm to detect the presence of a person's voice in an audio stream.

At step 208, one or more of the systems described herein may, in response to detecting that the different media stream has the more favorable characteristic, automatically select the different media stream to be the primary stream. For example, selection module 110 may, as part of server 106 in FIG. 1, in response to detecting that stream 124 has characteristic 126, automatically select media stream 124 to be the primary stream.

Selection module 110 may select a different media stream in response to a variety of possible triggers. For example, the systems described herein may detect that the current primary stream no longer has the favorable characteristic and a different media stream now has the favorable characteristic. In one example, the systems described herein may determine that a different media stream now has a higher independent viewership than the current primary stream, and selection module 110 may select the new most popular media stream in response.

In some embodiments, selection module 110 may not select a new stream unless the new stream maintains the more favorable characteristic for a certain length of time and/or the characteristic is more favorable by a certain amount. For example, in order to avoid rapidly switching back and forth between two streams with similar popularity, selection module 110 may not select a different media stream unless the stream has the highest viewership number for more than ten seconds and/or is at least 10% more popular than the current primary stream. Additionally or alternatively, selection module 110 may automatically select a new stream after a predetermined maximum amount of time (e.g., one minute, two minutes, three minutes, five minutes, etc.). For example, if a particular stream has been the main stream for three minutes, selection module 110 may automatically select a similarly favorable stream as the new main stream to avoid staleness.

Figure 4A:
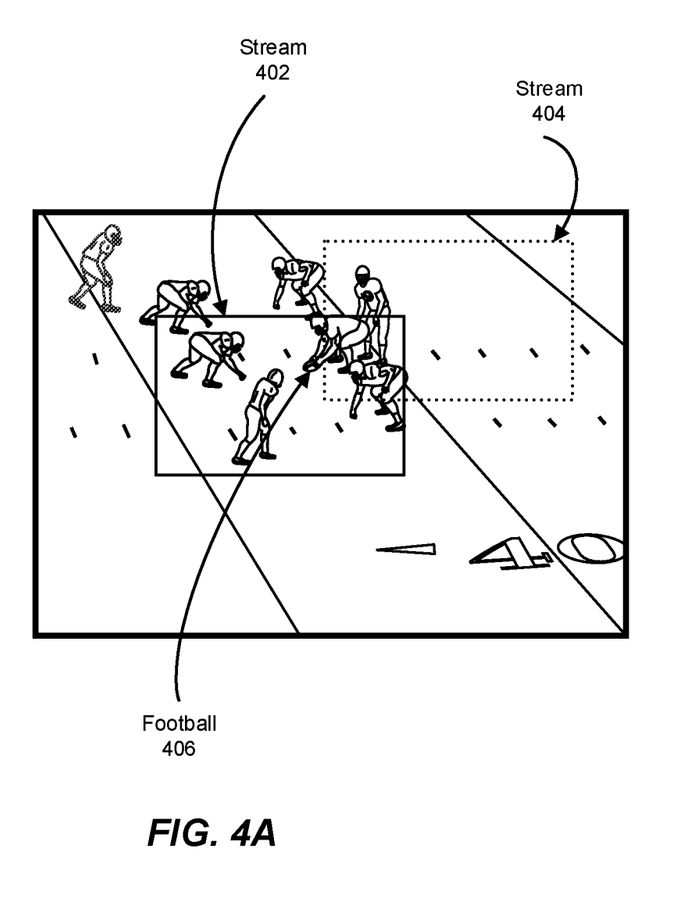
FIGS. 4A and 4B are illustrations of an exemplary system for automatically switching between media streams to follow a point-scoring object.
Figure 4B:
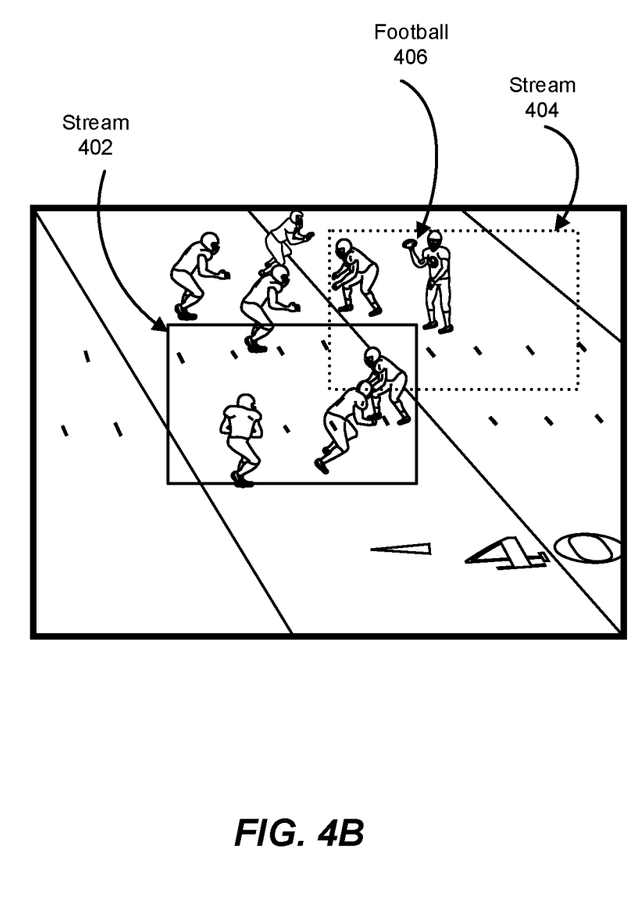

In another example, the systems described herein may detect that a point-scoring object (e.g., a football, soccer ball, volleyball, hockey puck, caber, curling stone, etc.) has exited the frame of the current primary media stream and is now in the frame of a different media stream. For example, as illustrated in FIG. 4A, the systems described herein may initially detect a football 406 is visually present in a stream 402 but not a stream 404. In this example, the systems described herein may select stream 402 as the primary stream. After a few seconds of play, as illustrated in FIG. 4B, the systems described herein may detect that football 406 is now visible in stream 404 but not in stream 402. In this example, the systems described herein may select stream 404 as the primary stream, replacing stream 402.

Figure 5A:
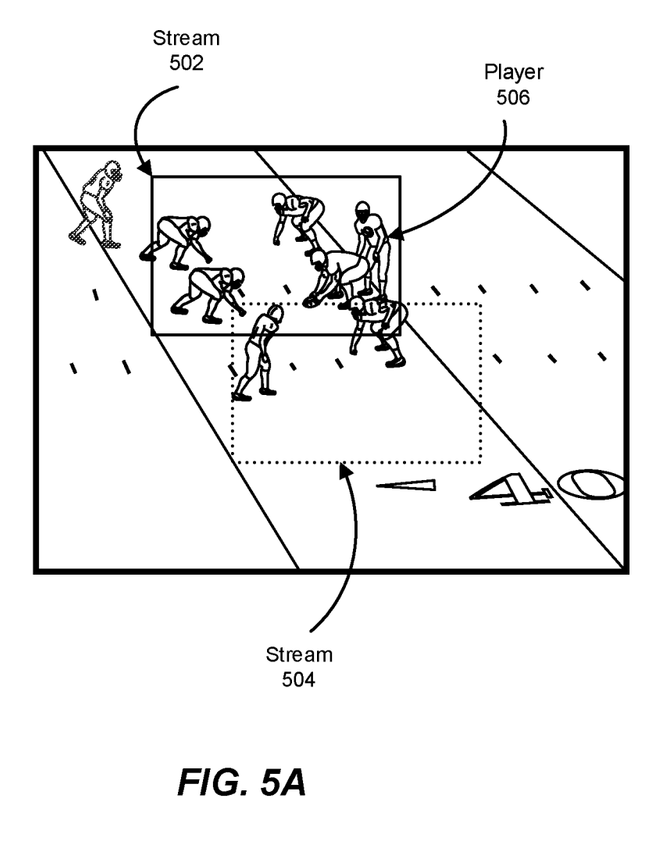
FIGS. 5A and 5B are illustrations of an exemplary system for automatically switching between media streams to follow a person.
Figure 5B:
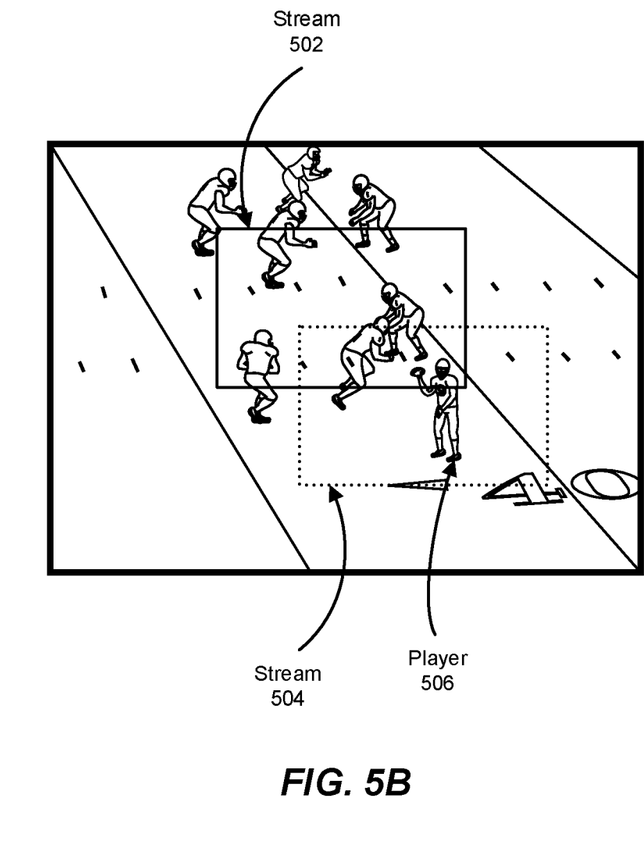

In another example, while the current primary media stream may still have the favorable characteristic, another media stream may have a more favorable characteristic. For example, as illustrated in FIG. 5A, a player 506 may be visually present in the frame of a stream 502 but not in the frame of a stream 504. In response to detecting this, the systems described herein may designate stream 502 as the primary stream. Later, as illustrated in FIG. 5B, player 506 may still be partially visible in stream 502 but may be more visible in stream 504. In this example, the systems described herein may select stream 504 as the primary stream because stream 504 has a better view of player 506 than stream 502, even though player 506 is still visually present in stream 502.

In some embodiments, the systems described herein may weight multiple characteristics and/or select streams based on a combination of characteristics. For example, the presence of a football in the camera frame may be a favorable characteristic, but a stream having the characteristic of being an instant replay may be a more highly weighted favorable characteristic. In one example, the systems described herein may automatically select any stream that is an instant replay, but may otherwise select whichever stream has the best view (e.g., most zoomed-in view) of the football or whichever stream has the most independent viewers. In another example, the systems described herein may select only streams which include the football, but among these streams, may select the stream with the highest number of independent viewers.

Additionally or alternatively, selection module 110 may select a stream based on a predetermined trigger. For example, if a commercial break begins, selection module 110 may automatically select the stream containing the commercial. In one embodiment, selection module 110 may select a blank stream that contains no content in order to enable dynamic advertisement insertion relevant to each user. In another example, if a referee calls a timeout during a sporting event, selection module 110 may automatically select a stream showing commentators on the sporting event.

In some embodiments, the systems described herein may limit how often selection module 110 selects a new stream to be the primary stream in order to prevent viewers from becoming confused or annoyed by multiple rapid switches between streams. For example, the systems described herein may limit selection module 110 to selecting a new stream once every second, every five seconds, or every ten seconds. In another example, the systems described herein may limit selection module 110 to selecting a new stream twice in one minute or three times in two minutes.

Returning to FIG. 2, at step 210, one or more of the systems described herein may transmit the different media stream to the at least one viewer of the event. For example, transmission module 114 may, as part of server 106 in FIG. 1, transmit media stream 124 to the at least one viewer of the event.

Transmission module 114 may transmit the primary stream of the event to one or more viewers in a variety of ways and/or contexts. For example, transmission module 114 may transmit the primary stream via a television channel, a social media platform, a media streaming application, and/or any type of other suitable platform.

Figure 6:
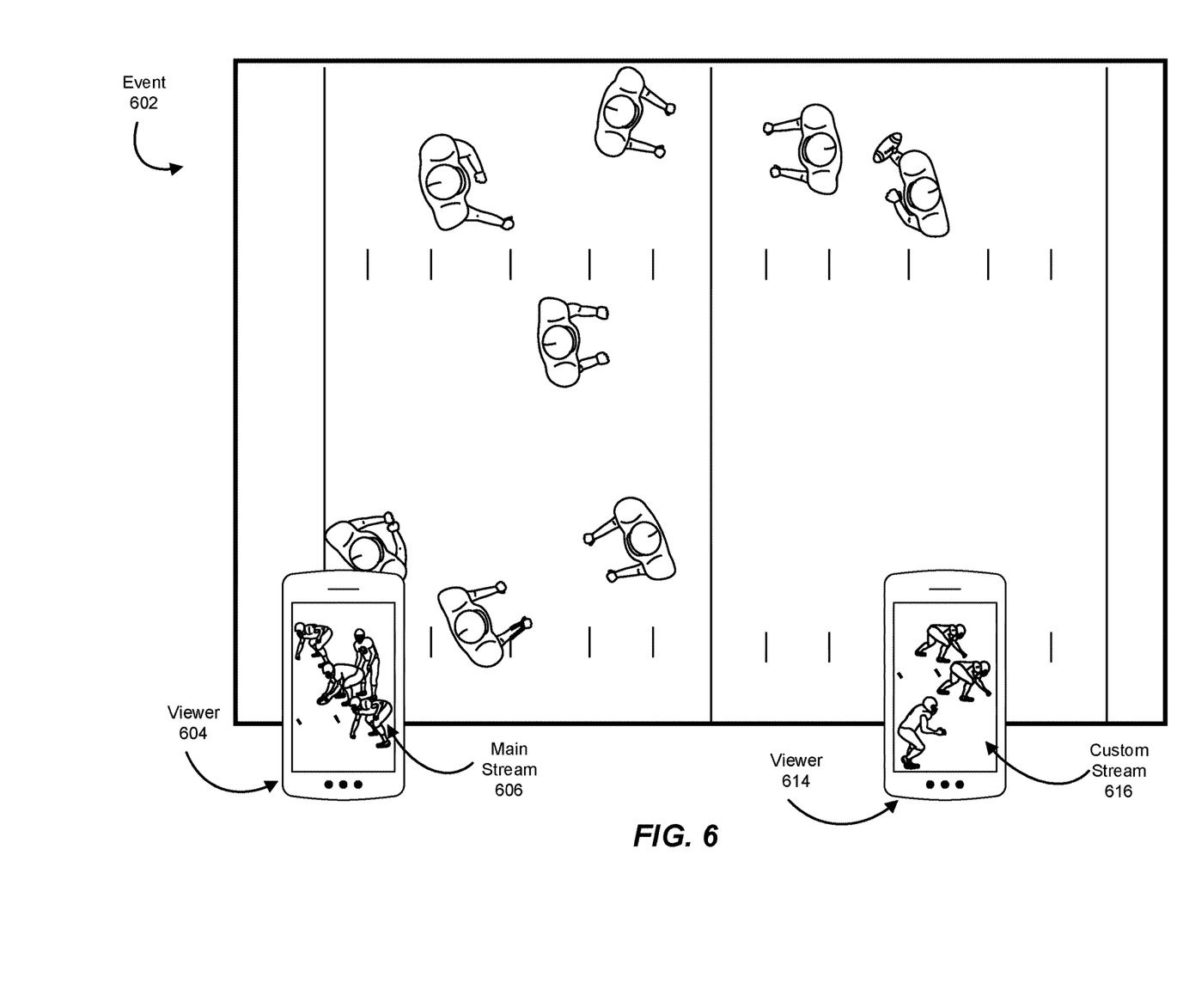
FIG. 6 is an illustration of an exemplary system for automatically switching between media streams tailored to the viewer.

In some embodiments, transmission module 114 may transmit different primary streams to different viewers. For example, transmission module 114 may transmit a main stream by default to viewers on a social networking platform and a custom stream by default to a viewer who has chosen a custom stream option. In one example, as illustrated in FIG. 6, transmission module 114 may transmit a main stream 606 of an event 602 to a viewer 604 and/or a custom stream 616 of event 602 to a viewer 614.

In some examples, the systems described herein may select which of multiple streams of event 602 to transmit as main stream 606 based on which stream has the most independent viewers. By contrast, the systems described herein may enable viewer 614 to configure custom stream 616 by selecting a preferred characteristic that the systems described herein should use to select streams. For example, viewer 614 may be a fan of a particular football player and may configure the systems described herein to follow the player. In this example, the systems described herein may select streams in which the player is visibly present to be the primary stream for custom stream 616, regardless of what characteristic is used to select the primary stream for main stream 606. In another example, viewer 614 may prefer to listen to audio commentary from a particular commentator when available. In this example, the systems described herein may select an audio stream of commentary from that commentator when the commentator is speaking and may otherwise select the most popular audio stream.

Figure 7:
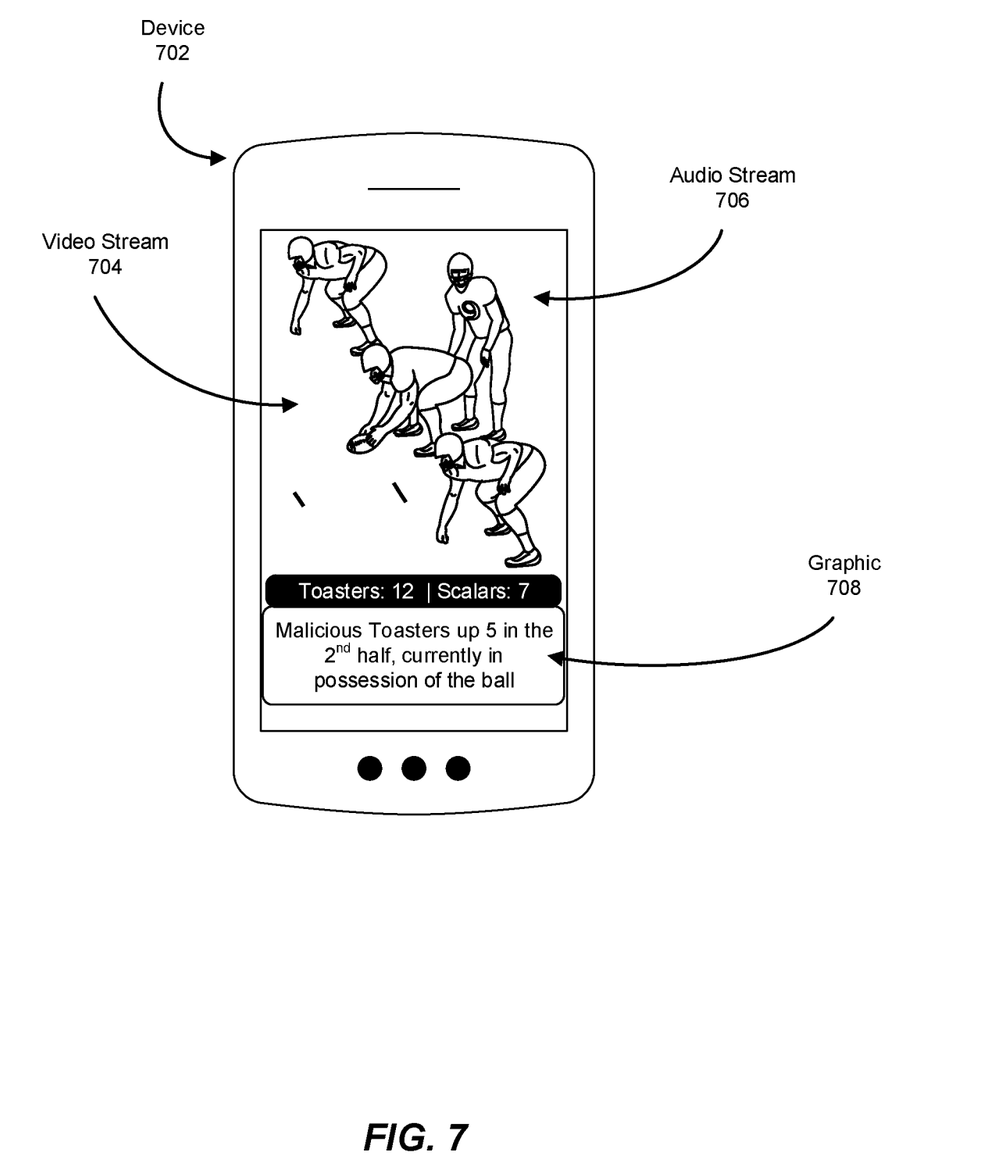
FIG. 7 is an illustration of an automatically generated primary media stream with graphics.

In some embodiments, the systems described herein may combine an automatically selected video stream, an automatically selected audio stream, and/or automatically selected and/or generated graphics into a primary stream of an event. For example, as illustrated in FIG. 7, the systems described herein may select a video stream 704 and/or an audio stream 706 of an event. In some examples, the systems described herein may select (e.g., from a library of graphics and/or from a human-created graphic source) and/or generate a graphic 708 relevant to the event to be displayed temporarily over video stream 704. The systems described herein may select and/or generate various types of graphics, such as the names of presenters, performers, speakers, and/or players, statistics about players and/or sporting events, transcriptions and/or captions of audio, highlights of various objects and/or people within a video stream (e.g., a football, the ten yard line, etc.), and/or any other relevant graphic. In some embodiments, the systems described herein may transmit video stream 704, audio stream 706, and/or graphic 708 to a device 702 operated by a viewer of the event. The graphics may be composited into the video or delivered as a separate stream which is overlayed via an alpha channel graphic, allowing viewers to turn graphics on or off and/or select relevant content.

As described above, the systems and methods described herein may function in a similar role to that of a human technical director on a video production, selecting and switching between video and/or audio streams to produce a primary stream of an event that includes content and camera angles most likely to be relevant to viewers of the event. In some embodiments, the systems described herein may determine what stream is relevant and/or enjoyable based on popularity metrics for individual streams. Additionally or alternatively, the systems described herein may track objects or individuals across cameras, ensuring that a football, a star performer, or other relevant person or item is always visible or audible. By enabling users to configure which characteristic or characteristics the system uses to select streams, the systems described herein may create a custom stream on the fly that is tailored to an individual user's interests. For example, the systems described herein may enable a parent to watch a stream of a youth soccer game that always follows their child, rather than being forced to watch the main stream that only sometimes shows their child or to manually switch between camera streams in an attempt to find one that currently shows their child. By automatically creating primary streams for events from multiple sources of audio and visual data, the systems described herein may create enjoyable and relevant content for users in an efficient manner that is not constrained by human availability or reaction time.

EXAMPLE EMBODIMENTS

Example 1: A method for automatically switching between media streams may include (i) identifying a plurality of media streams of an event, where one media stream from the plurality is designated as a primary stream of the event that is transmitted by default to at least one viewer of the event, (ii) selecting a media stream from the plurality of media streams to be the primary stream based on a favorable characteristic of the media stream, (iii) detecting that a different media stream within the plurality of media streams has a more favorable characteristic compared to the media stream, (v) in response to detecting that the different media stream has the more favorable characteristic, automatically selecting the different media stream to be the primary stream and (v) transmitting the different media stream to the at least one viewer of the event.

Example 2: The computer-implemented method of example 1, where the favorable characteristic includes a number of viewers selecting the media stream from a list of media streams of the event and the more favorable characteristic includes a greater number of viewers selecting the different media stream than the number of viewers selecting the media stream.

Example 3: The computer-implemented method of examples 1-2, where selecting the media stream from the plurality of media streams to be the primary stream based on the favorable characteristic of the media stream includes determining that the media stream has a highest viewership out of all the media streams in the plurality of media streams.

Example 4: The computer-implemented method of examples 1-3, where the event includes a sporting event that includes a movable point-scoring object and the favorable characteristic includes a visual presence of the movable point-scoring object in the media stream.

Example 5: The computer-implemented method of examples 1-4, where the event includes multiple participants and the favorable characteristic includes at least one of an audio or visual presence of a specific participant in the media stream.

Example 6: The computer-implemented method of examples 1-5, where the event includes multiple participants that alternate speaking and the favorable characteristic includes at least one of an audio or visual presence of a currently speaking participant in the media stream.

Example 7: The computer-implemented method of examples 1-6, where the plurality of media streams of the event include a plurality of video streams of the event.

Example 8: The computer-implemented method of examples 1-7, where the plurality of video streams of the event include video streams from a plurality of cameras each capturing the event at a different camera angle.

Example 9: The computer-implemented method of examples 1-8, where the event includes a live event and the plurality of media streams include a plurality of real-time streams of the live event.

Example 10: The computer-implemented method of examples 1-9, where the primary stream of the event that is transmitted by default includes a main stream that is transmitted by default to any viewer of the event who does not select a specific non-default stream.

Example 11: The computer-implemented method of examples 1-10, where the primary stream of the event that is transmitted by default includes a custom stream that is transmitted by default to a specific viewer of the event.

Example 12: The computer-implemented method of examples 1-11 may further include receiving a selection of a preferred characteristic from the specific viewer and selecting a particular media stream from the plurality of media streams to be the primary stream in response to detecting that the particular media stream includes the preferred characteristic.

Example 13: The computer-implemented method of examples 1-12, where the primary stream of the event that is transmitted by default includes a main stream that is transmitted by default to viewers who are viewing the event via a social media platform.

Example 14: The computer-implemented method of examples 1-13, where the plurality of media streams of the event include a plurality of audio streams of the event.

Example 15: A system for automatically switching between media streams may include at least one physical processor and physical memory including computer-executable instructions that, when executed by the physical processor, cause the physical processor to (i) identify a plurality of media streams of an event, where one media stream from the plurality is designated as a primary stream of the event that is transmitted by default to at least one viewer of the event, (ii) select a media stream from the plurality of media streams to be the primary stream based on a favorable characteristic of the media stream, (iii) detect that a different media stream within the plurality of media streams has a more favorable characteristic compared to the media stream, (v) in response to detecting that the different media stream has the more favorable characteristic, automatically select the different media stream to be the primary stream and (v) transmit the different media stream to the at least one viewer of the event.

Example 16: The system of example 15, where the favorable characteristic includes a number of viewers selecting the media stream from a list of media streams of the event and the more favorable characteristic includes a greater number of viewers selecting the different media stream than the number of viewers selecting the media stream.

Example 17: The system of examples 15-16, where selecting the media stream from the plurality of media streams to be the primary stream based on the favorable characteristic of the media stream includes determining that the media stream has a highest viewership out of all the media streams in the plurality of media streams.

Example 18: The system of examples 15-17, where the event includes a sporting event that includes a movable point-scoring object and the favorable characteristic includes a visual presence of the movable point-scoring object in the media stream.

Example 19: The system of examples 15-18, where the event includes multiple participants and the favorable characteristic includes at least one of an audio or visual presence of a specific participant in the media stream.

Example 20: A non-transitory computer-readable medium may include one or more computer-readable instructions that, when executed by at least one processor of a computing device, cause the computing device to (i) identify a plurality of media streams of an event, where one media stream from the plurality is designated as a primary stream of the event that is transmitted by default to at least one viewer of the event, (ii) select a media stream from the plurality of media streams to be the primary stream based on a favorable characteristic of the media stream, (iii) detect that a different media stream within the plurality of media streams has a more favorable characteristic compared to the media stream, (v) in response to detecting that the different media stream has the more favorable characteristic, automatically select the different media stream to be the primary stream and (v) transmit the different media stream to the at least one viewer of the event.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a first selection of a first preferred characteristic from a first viewer and a second selection of a second preferred characteristic from a second viewer;
   identifying a plurality of media streams of an event, wherein a first media stream from the plurality is designated as a first primary stream of the event that is transmitted by default to the first user and wherein a second media stream from the plurality is designated as a second primary stream of the event that is transmitted by default to at least the second user;
   selecting the first media stream from the plurality of media streams to be the first primary stream based on a favorable characteristic of the first media stream correlating with the first preferred characteristic and selecting the second media stream from the plurality of media streams to be the second primary stream based on a favorable characteristic of the second media stream correlating with the second preferred characteristic;
   transmitting the first media stream to the first viewer and the second media stream to the second viewer;
   detecting that a different media stream within the plurality of media streams has a more favorable characteristic correlated with the first preferred characteristic compared to the first media stream;
   in response to detecting that the different media stream has the more favorable characteristic, automatically selecting the different media stream to be the first primary stream; and
   transmitting the different media stream to the first viewer.

2. The computer-implemented method of claim 1, wherein the first favorable characteristic comprises a number of viewers selecting the first media stream from a list of media streams of the event and the more favorable characteristic comprises a greater number of viewers selecting the different media stream than the number of viewers selecting the first media stream.

3. The computer-implemented method of claim 1, wherein selecting the first media stream from the plurality of media streams to be the first primary stream of the event based on the favorable characteristic of the first media stream comprises determining that the first media stream has a highest viewership out of all the media streams in the plurality of media streams.

4. The computer-implemented method of claim 1, wherein:
the event comprises a sporting event that comprises a movable point-scoring object; and
the favorable characteristic of the first media stream comprises a visual presence of the movable point-scoring object in the media stream.

5. The computer-implemented method of claim 1, wherein:
the event comprises multiple participants; and
the favorable characteristic of the first media stream comprises at least one of an audio or visual presence of a specific participant in the media stream.

6. The computer-implemented method of claim 1, wherein:
the event comprises multiple participants that alternate speaking; and
the favorable characteristic of the first media stream comprises at least one of an audio or visual presence of a currently speaking participant in the media stream.

7. The computer-implemented method of claim 1, wherein the plurality of media streams of the event comprise a plurality of video streams of the event.

8. The computer-implemented method of claim 7, wherein the plurality of video streams of the event comprise video streams from a plurality of cameras each capturing the event at a different camera angle.

9. The computer-implemented method of claim 1, wherein the event comprises a live event and the plurality of media streams comprise a plurality of real-time streams of the live event.

10. The computer-implemented method of claim 1, wherein the primary stream of the event that is transmitted by default comprises a main stream that is transmitted by default to any viewer of the event who does not select a specific non-default stream.

11. The computer-implemented method of claim 1, wherein the first primary stream of the event that is transmitted by default comprises a custom stream that is transmitted by default to a specific viewer of the event.

12. The computer-implemented method of claim 11, further comprising:
generating an overlay graphic relevant to the event to be temporarily displayed over the first primary media stream;
compositing the first primary media stream and the overlay graphic into a composite media stream;
transmitting the composite media stream to the first viewer.

13. The computer-implemented method of claim 1, wherein the primary stream of the event that is transmitted by default comprises a main stream that is transmitted by default to viewers who are viewing the event via a social media platform.

14. The computer-implemented method of claim 1, wherein the plurality of media streams of the event comprises a plurality of audio streams of the event.

15. A system comprising:
at least one physical processor;
physical memory comprising computer-executable instructions that, when executed by the physical processor, cause the physical processor to:
receive a first selection of a first preferred characteristic from a first viewer and a second selection of a second preferred characteristic from a second viewer;
identify a plurality of media streams of an event, wherein a first media stream from the plurality is designated as a first primary stream of the event that is transmitted by default to the first user and wherein a second media stream from the plurality is designated as a second primary stream of the event that is transmitted by default to at least the second user;
select the first media stream from the plurality of media streams to be the first primary stream based on a favorable characteristic of the first media stream correlating with the first preferred characteristic and selecting the second media stream from the plurality of media streams to be the second primary stream based on a favorable characteristic of the second media stream correlating with the second preferred characteristic;
transmit the first media stream to the first viewer and the second media stream to the second viewer;
detect that a different media stream within the plurality of media streams has a more favorable characteristic correlated with the first preferred characteristic compared to the first media stream;
in response to detecting that the different media stream has the more favorable characteristic, automatically select the different media stream to be the first primary stream; and
transmit the different media stream to the first viewer.

16. The system of claim 15, wherein the first favorable characteristic comprises a number of viewers selecting the first media stream from a list of media streams of the event and the more favorable characteristic comprises a greater number of viewers selecting the different media stream than the number of viewers selecting the first media stream.

17. The system of claim 15, wherein selecting the first media stream from the plurality of media streams to be the first primary stream of the event based on the favorable characteristic of the first media stream comprises determining that the first media stream has a highest viewership out of all the media streams in the plurality of media streams.

18. The system of claim 15, wherein:
the event comprises a sporting event that comprises a movable point-scoring object; and
the favorable characteristic of the first media stream comprises a visual presence of the movable point-scoring object in the media stream.

19. The system of claim 15, wherein:
the event comprises multiple participants; and
the favorable characteristic of the first media stream comprises at least one of an audio or visual presence of a specific participant in the media stream.

20. A non-transitory computer-readable medium comprising one or more computer-readable instructions that, when executed by at least one processor of a computing device, cause the computing device to:
receive a first selection of a first preferred characteristic from a first viewer and a second selection of a second preferred characteristic from a second viewer;
identify a plurality of media streams of an event, wherein a first media stream from the plurality is designated as a first primary stream of the event that is transmitted by default to the first user and wherein a second media stream from the plurality is designated as a second primary stream of the event that is transmitted by default to at least the second user;

select the first media stream from the plurality of media streams to be the first primary stream based on a favorable characteristic of the first media stream correlating with the first preferred characteristic and selecting the second media stream from the plurality of media streams to be the second primary stream based on a favorable characteristic of the second media stream correlating with the second preferred characteristic;

transmit the first media stream to the first viewer and the second media stream to the second viewer;

detect that a different media stream within the plurality of media streams has a more favorable characteristic correlated with the first preferred characteristic compared to the first media stream;

in response to detecting that the different media stream has the more favorable characteristic, automatically select the different media stream to be the first primary stream; and transmit the different media stream to the first viewer.

* * * * *